United States Patent [19]

Nakamura

[11] Patent Number: 4,462,859

[45] Date of Patent: Jul. 31, 1984

[54] ARMATURE WINDING

[75] Inventor: Kenichi Nakamura, Sakura, Japan

[73] Assignee: Hitachi, Ltd., Tokyo, Japan

[21] Appl. No.: 156,610

[22] Filed: Jun. 5, 1980

[30] Foreign Application Priority Data

Jun. 27, 1979 [JP] Japan .................................. 54-80184

[51] Int. Cl.³ ............................................ H02K 3/00
[52] U.S. Cl. .................................... 310/198; 310/206; 310/207
[58] Field of Search ............... 310/198, 201, 207, 208, 310/71

[56] References Cited

U.S. PATENT DOCUMENTS

| 2,180,327 | 11/1939 | Wilber | 310/203 |
| 3,201,627 | 8/1965 | Harrington | 310/206 X |
| 3,255,368 | 6/1966 | Rauhut | 310/206 X |
| 3,728,567 | 4/1973 | Picmaus | 310/198 |
| 4,227,107 | 10/1980 | Ban et al. | 310/198 |

Primary Examiner—Donovan F. Duggan
Attorney, Agent, or Firm—Antonelli, Terry & Wands

[57] ABSTRACT

An armature winding assembled in an armature core is formed by concentrically continuously winding a plurality of coils having respectively different coil pitches. The starting-end and terminating-end terminal conductors of the plural concentrically continuously wound coils are led out along the opposite coil sides respectively of the coil having the longest coil pitch among the plural coils.

4 Claims, 11 Drawing Figures

ARMATURE WINDING

BACKGROUND OF THE INVENTION

1. Field of the Invention

This invention relates to an armature winding assembled in an armature core, and more particularly to an armature winding of the so-called concentric wound type in which a plurality of coils having respectively different coil pitches are concentrically continuously wound around the armature axis to form each of a plurality of magnetic poles.

2. Description of the Prior Art

In an armature winding of the so-called concentric wound type, a plurality of coils having respectively different coil pitches are concentrically wound around the axis of each pole. These plural coils are continuously wound to form each of a plurality of magnetic poles. There are generally two methods for concentrically continuously winding such coils each of which has a coil pitch different from that of another. According to one of the methods, the coil having the longest coil pitch is wound first of all, the coils having successively shorter coil pitches being then successively wound in the above order, and finally the coil having the shortest coil pitch is wound. According to the other method, the winding sequence is reversed to that above described and is such that the coil having the shortest coil pitch is wound first of all, the coils having successively longer coil pitches being then successively wound in the above order, and the coil having the longest coil pitch is finally wound. Therefore, the plural continuously wound coils have a starting end at which the winding of the plural coils is started and a terminating end at which the winding of the plural coils is terminated. The conductor portions in the starting end and terminating end of the plural continuously wound coils will be called hereinafter terminal conductors to be distinguished from the remaining conductor portions of the coils. One of the terminal conductors is led out along one of the coil sides of the coil having the longest coil pitch, while the other terminal conductor is led out along one of the coil sides of the coil having the shortest coil pitch. Thus, when such coils are continuously wound in a concentric pattern to provide an armature winding assembled in a slotted armature core, a terminal conductor is led out necessarily from the coil having the shortest coil pitch as described above, and various objectionable problems as pointed out below have been inevitably encountered during the assembling of the plural coils in the slotted armature core due to the presence of such a terminal conductor.

After the step of assembling of the armature winding in the slotted armature core, it is necessary to shape the coil ends of the armature winding so that the coil ends can be configured to satisfy the predetermined dimensional requirement. This is generally mechanically done by the use of a set of shaping jigs together with a press such as a hydraulic press or a pneumatic press. It is to be noted in this case that the aforementioned terminal conductors of the armature winding assembled in the slotted armature core have no fixed figure. Therefore, when the coil ends are subjected to the mechanical shaping in such a state, the coil ends will be mechanically shaped in a condition in which the terminal conductors will be clamped between the armature core and one of the shaping jigs or they will be abnormally deformed. This will result in damage to or severing of the terminal conductors or coils. It has therefore been a conventional practice to guide the terminal conductors along the coil ends to a position at which the terminal conductors are not affected by the shaping jigs, and then, to carry out the mechanical shaping of the coil ends. In this case, the terminal conductor of the coil, which has the shortest coil pitch and is located radially innermost in the group of the concentrically arranged coils, is guided to ride across the coil ends of the remaining coils having the coil pitches different from its coil pitch in the coil group until it is brought to the position at which it is not affected by the shaping jigs. The terminal conductor guided to such a position will cross at substantially right angles the conductors forming the coil ends of the individual coils. When the coil ends are shaped in such a condition, a concentrated stress is imparted to the area in which this terminal conductor makes a point contact with the coil-end conductors. The coil ends mechanically shaped in the above condition have been defective in that the insulator layer covering the conductors tends to be damaged resulting in an objectionable reduction in the insulation of the coils. It has therefore been a conventional practice that such a terminal conductor is passed between the conductors forming the coil ends so as to minimize the number of cross points between this terminal conductor and the conductors forming the coil ends and is then guided to the position at which it is not affected by the shaping jigs. However, many man-hours have been inevitably required for the mechanical shaping of the coil ends due to the fact that such a step resorts to manual handling. In the case of the terminal conductor of the coil having the longest coil pitch, such a problem is not encountered since it can be led out without crossing the conductors forming the coil ends.

SUMMARY OF THE INVENTION

It is an object of the present invention to provide an armature winding which is arranged so as to facilitate handling of the terminal conductors in mechanic mechanical shaping of the coil ends.

Another object of the present invention is to provide an armature winding which is arranged so as to minimize objectionable damage to the terminal conductors of the coils and also to the conductors forming the coil ends of the coils, due to the contact between the former conductors and the latter conductors.

The armature winding according to the present invention comprises a plurality of coils concentrically continuously wound around the axis of each pole and having respectively different coil pitches. In the armature winding comprising such coils, the coil having the longest coil pitch may be wound first of all, and then, the coils having successively shorter coil pitches may be successively wound in the above order, or, on the contrary, the coil having the shortest coil pitch may be wound first of all, and then, the coils having successively longer coil pitches may be successively wound in the above order. According to the present invention, the starting-end terminal conductor and the terminating-end terminal conductor of the plural coils concentrically continuously wound in the order above described are led out respectively along the opposite coil sides of the coil having the longest coil pitch among the plural coils.

In the armature winding arrangement in which the coil having the longest coil pitch is wound first of all, and then, the coils having successively shorter coil pitches are successively wound in the above order, the terminating-end terminal conductor led out from one of the coil sides of the coil having the shortest coil pitch is guided to extend in the reverse direction along the other coil side of this coil again and is then guided toward one of the coil sides of the coil having the longest coil pitch, on which side the starting-end terminal conductor is not located, so that this terminating-end terminal conductor is led out along this coil side of the coil having the longest coil pitch. The terminating-end terminal conductor led out from one of the coil sides of the coil having the shortest coil pitch may be guided via one of the coil sides of the coil having the longest coil pitch, on which side the starting-end terminal conductor is located, and may then be led out along the other coil side of the coil having the longest coil pitch, on which side the starting-end terminal conductor is not located. Further, the terminating-end terminal conductor led out from one of the coil sides of the coil having the shortest coil pitch may be guided via another coil or successive individual coils from this position to be finally led out along the other coil side of the coil having the longest coil pitch, on which side the starting-end terminal conductor is not located.

In the armature winding arrangement in which the coil having the shortest coil pitch is wound first of all, and then, the coils having successively longer coil pitches are successively wound in the above order, the starting-end terminal conductor may be guided toward one of the coil sides of the coil having the shortest coil pitch via the position of one of the coil sides of or the positions of the opposite coil sides of the coil having the longest coil pitch which is to be finally wound. The plural coils are wound in the above order. Alternatively, the starting-end terminal conductor guided via the position of one of the coil sides of or the positions of the opposite coil sides of the coil having the longest coil pitch which is to be finally wound may be guided toward the position of one of the coil sides of the coil having the shortest coil pitch via the positions of the individual coils which are to be wound before the coil having the longest coil pitch is wound.

The armature winding according to the present invention may also be arranged in a manner as described below. In this arrangement, the plural coils are wound in the order of from that having the longest coil pitch to that having the shortest coil pitch. In this winding step, the individual coils having the coil pitches different from one another are initially partly wound, and then, the remaining portions of the coils are wound continuously in the order of from that having the shortest coil pitch to that having the longest coil pitch, until all the coils having the respectively different coil pitches are completed. In the armature winding thus obtained, the starting-end terminal conductor and the terminating-end terminal conductor are led out respectively along the opposite coil sides of the coil having the longest coil pitch.

In the armature winding according to the present invention, the starting-end terminal conductor and the terminating-end terminal conductor of the plural coils concentrically continuously wound and having the respectively different coil pitches are thus led out along the coil sides of the coil having the longest coil pitch. Therefore, the terminal conductors can be merely guided along the coil ends toward such a position that they are not affected by the shaping jigs during the step of mechanical shaping of the coil ends, so that the terminal conductors can be very easily handled, and the man-hours required for handling can be greatly reduced.

Further, due to the fact that the terminal conductors are led out along the coil sides of the coil having the longest coil pitch among the plural coils, these conductors can be guided toward the position at which they are not affected by the shaping jigs. These terminal conductors extend along the coil ends or cross the coil-end conductors in an oblique relation without crossing the latter conductors at right angles. Therefore, the area of contact between the terminal conductors and the coil-end conductors can be increased, and the shaping pressure imparted to the coil ends by the shaping jigs during the step of mechanical shaping of the coil ends can be distributed without being concentrated thereby greatly reducing the possibility of damage to the terminal conductors and/or the coil-end conductors during the step of mechanical shaping of the coil ends.

The terminal conductor of the coil having the shortest coil pitch among the plural coils may be led out along one of the coil sides of the coil having the longest coil pitch via one of the coil sides of a selected one of the plural coils. This arrangement can simplify the structure of the armature winding and can reduce the number of cross points between this terminal conductor and the coil-end conductors, thereby providing desirable results from the electrical, mechanical and operational viewpoints.

DESCRIPTION OF THE PREFERRED EMBODIMENTS

For a better understanding of the present invention, a prior art armature winding will be described before describing preferred embodiments of the present invention in detail.

Figure 1:
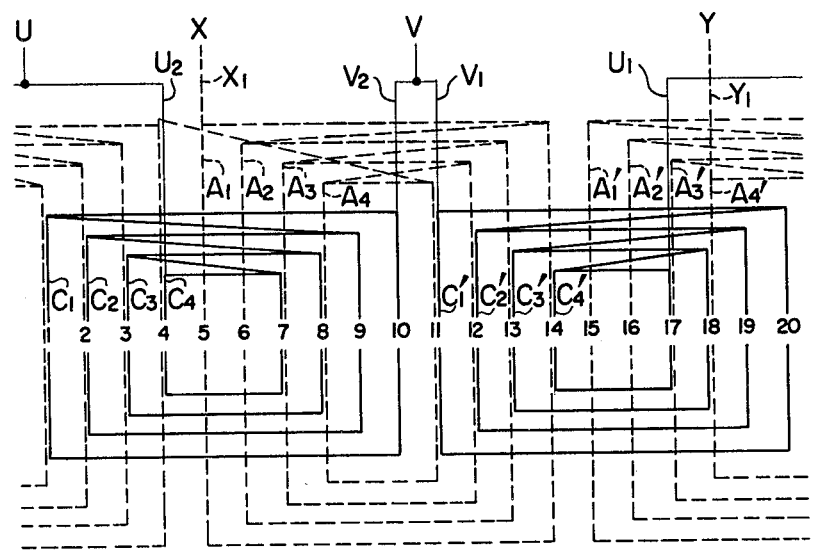
FIG. 1 is a developed view of a conventional armature winding.

FIG. 1 is a developed view of a prior art armature winding of the so-called concentric wound type applied to a resistance-start split-phase single-phase induction motor employing an armature of 2-pole 20-slot type.

Referring to FIG. 1, reference numerals 1, 2, 3, . . . , 20 designate slots formed in the armature core. Main coils are represented by the solid lines, and auxiliary coils are represented by the broken lines. Symbols U, V, X and Y denote lead-out terminals, and symbols $U_1$, $U_2$, $V_1$, $V_2$, $X_1$ and $Y_1$ denote terminal conductors of the coils. The main coil $C_1$ is received in the slots 1 and 10 to extend between these slots, and the main coil $C_2$ is received in the slots 2 and 9 to extend between these slots. The main coil $C_3$ is received in the slots 3 and 8 to extend between these slots, and the main coil $C_4$ is received in the slots 4 and 7 to extend between these slots. These four main coils $C_1$, $C_2$, $C_3$ and $C_4$ provide one of the poles. Similarly, the main coils $C_1'$, $C_2'$, $C_3'$ and $C_4'$ are received in the slots 11 and 20, in the slots 12 and 19, in the slots 13 and 18, and in the slots 14 and 17 respectively, so that these four main coils $C_1'$, $C_2'$, $C_3'$ and $C_4'$ provide the other pole. The auxiliary coils $A_1$ to $A_4$ and $A_1'$ to $A_4'$ are assembled in the positions spaced apart by a predetermined electrical angle from the associated main coils $C_1$ to $C_4$ and $C_1'$ to $C_4'$ respectively. The auxiliary coils $A_1$, $A_2$, $A_3$ and $A_4$ providing one of the poles and those $A_1'$, $A_2'$, $A_3'$ and $A_4'$ providing the other pole are continuously wound.

It will be apparent from FIG. 1 that, in the group of the main coils $C_1$, $C_2$, $C_3$ and $C_4$ providing one of the poles, the terminal conductor $V_2$ is led out along one of the coil sides of the coil $C_1$ having the longest coil pitch, that is, along the slot 10, and the terminal conductor $U_2$ is led out along one of the coil sides of the coil $C_4$ having the shortest coil pitch, that is, along the slot 4. In the group of the main coils $C_1'$, $C_2'$, $C_3'$ and $C_4'$ providing the other pole, the terminal conductor $V_1$ is led out along one of the coil sides of the coil $C_1'$ having the longest coil pitch, that is, along the slot 11, and the terminal conductor $U_1$ is led out along one of the coil sides of the coil having the shortest coil pitch, that is, along the slot 17. The terminal conductors $V_1$ and $V_2$ are connected in common to the lead-out terminal V, and the terminal conductors $U_1$ and $U_2$ are connected in common to the lead-out terminal U.

The group of the auxiliary coils $A_1$, $A_2$, $A_3$ and $A_4$ providing one of the poles and the group of the auxiliary coils $A_1'$, $A_2'$, $A_3'$ and $A_4'$ providing the other pole are continuously wound to be connected in series. The terminal conductor $X_1$ is led out along one of the coil sides of the coil $A_1$, that is, along the slot 5, and the terminal conductor $Y_1$ is led out along one of the coil sides of the coil $A_4'$, that is, along the slot 18. The terminal conductor $X_1$ is connected to the lead-out terminal X, and the terminal conductor $Y_1$ is connected to the lead-out terminal Y.

Figure 2:
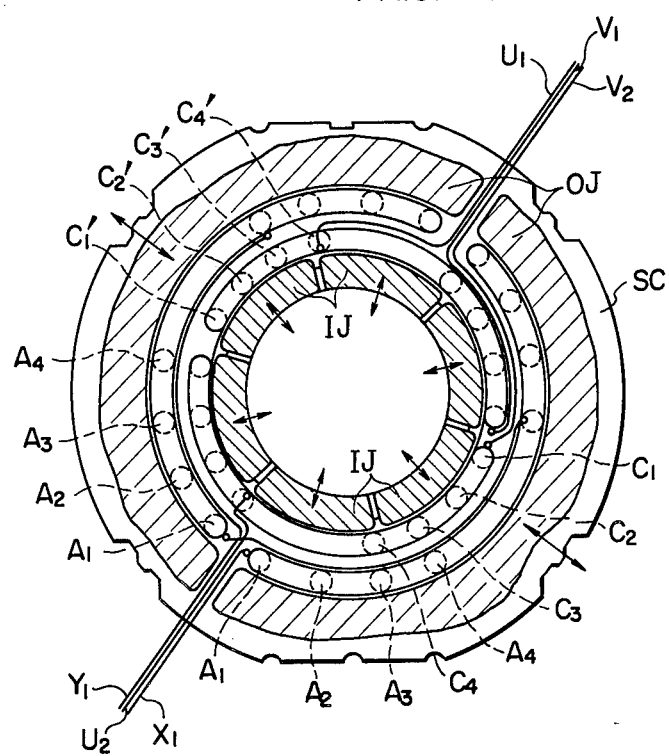
FIG. 2 is a sectional plan view illustrating the manner of shaping the coil ends of the armature winding shown in FIG. 1.

After the armature winding composed of the coils arranged in the manner above described has been mounted in position on the armature core, shaping jigs are generally used together with a press such as a hydraulic press or a pneumatic press for the mechanical shaping of the coil ends to configure the coil ends so that the configuration satisfies the predetermined dimensional requirement. FIG. 2 illustrates how the coil ends of the armature winding shown in FIG. 1 are mechanically shaped by the combination of an outside shaping jig OJ and an inside shaping jig IG imparting shaping pressure to the coil ends of the armature winding mounted in position on the slotted armature core SC. The outside shaping jig OJ is split into two sections for imparting shaping pressure radially inward to the coil ends of the individual coils. The inside shaping jig IG is split into six sections for imparting shaping pressure radially outward to the coil ends of the individual coils. Further, although not shown in FIG. 2, another jig is disposed above the coil ends for imparting squeezing pressure to the coil ends.

Figure 3:
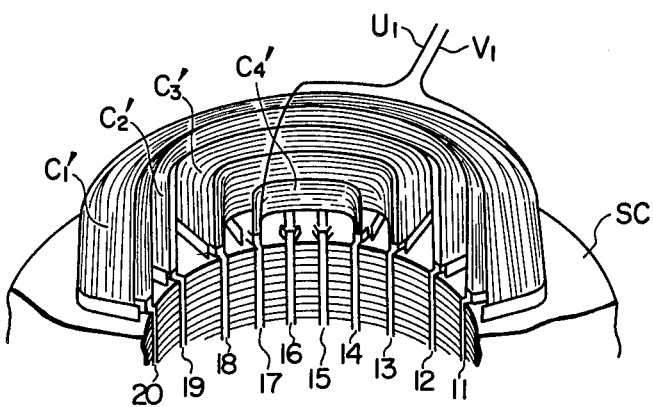
FIG. 3 is a perspective view of part of an armature constructed by assembling the armature winding of FIG. 1 in a slotted armature core.

In the armature winding composed of the plural coils arranged in the concentric pattern described with reference to FIG. 1, the terminal conductors $U_1$, $U_2$, $V_1$, $V_2$, $X_1$ and $Y_1$ do not always extend in their desired directions but extend rather in random directions. Therefore, unless the coil ends are mechanically shaped while holding these terminal conductors in their predetermined extending directions, the coil ends will be mechanically shaped by the shaping jigs OJ and IJ in the state in which one or more of the terminal conductors may be clamped between the armature core SC and the shaping jigs OJ and IG or they may be excessively deformed. In such a case, the terminal conductors will be damaged or severed. To avoid such a trouble, the terminal conductors are guided along the coil ends and are passed through the gaps between the split sections of the shaping jig OJ as shown in FIG. 2, so that they can be held in their predetermined extending directions during the step of mechanical shaping of the coil ends. As shown in FIG. 2, the terminal conductors $U_1$, $U_2$ and $Y_1$ leading from the respective coils $C_4'$, $C_4$ and $A_4'$, which are located radially innermost among the concentrically arranged coils and each of which has the shortest coil pitch, ride across the coil ends to be guided outward through the gaps between the split sections of the shaping jig OJ. Only the crossing status of the terminal conductor $U_1$ is shown in FIG. 3 by way of example. As a result, these terminal conductors $U_1$, $U_2$ and $Y_1$ cross at substantially right angles the conductors forming the coil ends of the individual coils. When the mechanical shaping with the shaping jigs OJ and IG is carried out in such a state, the crossing portions of the terminal conductors and coil-end conductors are pressed in the condition in which they make point contact with one another, and a concentrated stress will be imparted to these portions, resulting in damage to the insulator layer covering the conductors thereby degrading the insulation of the coils. It has therefore been a conventional practice that such terminal conductors $U_1$, $U_2$ and $Y_1$ are passed between the conductors in the coil ends so as to minimize the number of cross points between the terminal conductors $U_1$, $U_2$, $Y_1$ and the coil-end conductors forming the coil ends of the individual coils. According to such a conventional practice, however, many man-hours have been inevitably required for the desired mechanical shaping due to the fact that the terminal conductors $U_1$, $U_2$ and $Y_1$ must be manually passed between the coil-end conductors. In this connection, it will be noted that such a problem is not encountered in the case of the terminal conductors $V_1$, $V_2$ and $X_1$ leading from the respective coils $C_1'$, $C_1$ and $A_1$ having the longest coil pitch, since these terminal conductors can be guided along the coil ends without traversing the coil ends. Only the status of the terminal conductor $V_1$ is shown in FIG. 3 by way of example.

Preferred embodiments of the present invention obviating the problems pointed out above will now be described in detail with reference to FIGS. 4 to 11 in which the same reference numerals and symbols are used to denote the same parts appearing in FIG. 1.

Figure 4:
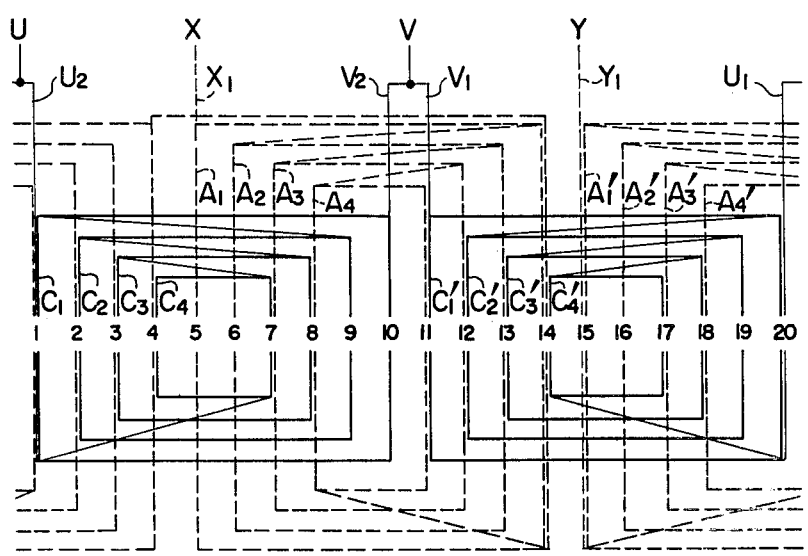
FIGS. 4, 5, 6, 7, 8, 9 and 10 are developed views of various embodiments of the present invention.
Figure 6:
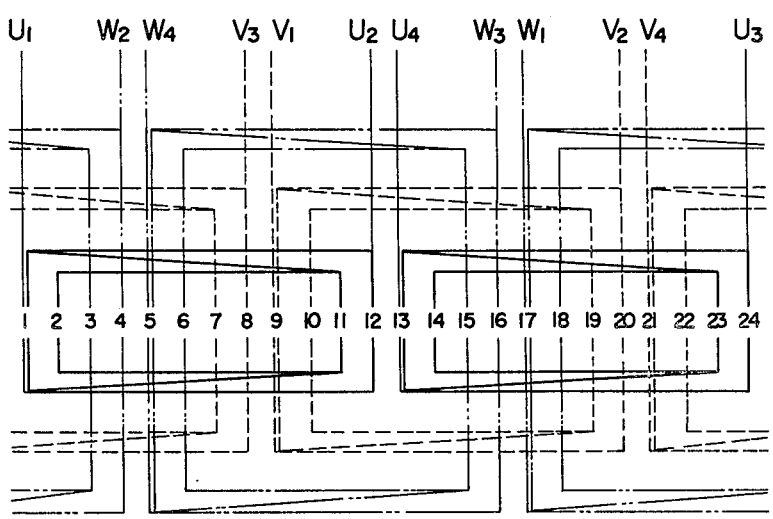

FIG. 4 shows an embodiment of the present invention which is applied to a split-phase induction motor employing an armature of 2-pole 20-slot type like that described with reference to FIG. 1. The armature winding of the present invention shown in FIG. 4 differs from the conventional one shown in FIG. 1 in that each of the terminal conductors $U_1$, $U_2$ and $Y_1$ is led out along one of the coil sides of the coil having the longest coil pitch instead of leading out the same along one of the coil sides of the coil having the shortest coil pitch. Referring to FIG. 4, the terminal conductor $U_1$ is not led out along the coil side of the portion of the main coil $C_4'$ received in the slot 17, but is led out through the slot 20 after passing it through the slot 14 and further extending it toward the slot 20. The terminal conductor $U_2$ is not led out along the coil side of the portion of the main coil $C_4$ received in the slot 4, but is led out through the slot 1 after passing it through the slot 7 and further extending it toward the slot 1. The terminal conductor $Y_1$ is not led out along the coil side of the portion of the auxiliary coil $A_4'$ received in the slot 18, but is led out through the slot 15 after passing it through the slot 1 and further extending it toward the slot 15. The terminal conductor of the auxiliary coil $A_4$ is extended toward the slot 14 and passed through this slot 14 to be connected to the terminal conductor of the auxiliary coil $A_1'$. The arrangement of the remaining terminal conductors is the same as that in the conventional winding.

In the manner described above, each of the starting-end and terminating-end terminal conductors of the group of concentrically arranged coils is led out along one of the coil sides of the coil having the longest coil pitch, so that the terminal conductors $U_1$, $U_2$ and $Y_1$ can be handled like the terminal conductors $V_1$, $V_2$ and $X_1$. That is, these terminal conductors $U_1$, $U_2$ and $Y_1$ can be very easily handled in the step of preparation for the mechanical shaping of the coil ends. Further, due to the fact that each of the terminal conductors $U_1$, $U_2$ and $Y_1$ is led out along one of the coil sides of the coil having the longest coil pitch, the conductors $U_1$, $U_2$ and $Y_1$ extending between the slots 14 and 20, between the slots 1 and 7, and between the slots 1 and 15, respectively, traverse the coil ends at an angle considerably smaller or larger than 90°. Therefore, the terminal conductors $U_1$, $U_2$ and $Y_1$ traversing the coil ends in oblique relation over the coil-end conductors at such an angle that the former conductors make line contact with the latter conductors instead of point contact, and, as a result, the contact area therebetween becomes larger than in the case of the prior art arrangement. Therefore, the shaping pressure imparted by the shaping jigs OJ and IG to the coil ends during the step of mechanical shaping is distributed without being concentrated due to the large contact area between the terminal conductors and the coil-end conductors, so that objectionable damage to the conductors can be greatly reduced or minimized.

Figure 5:
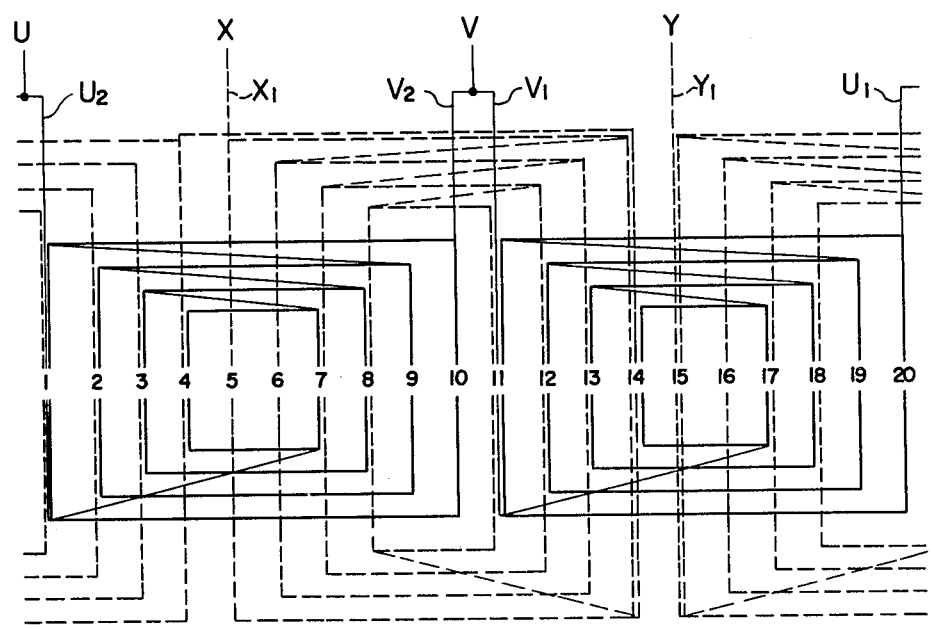
Figure 7:
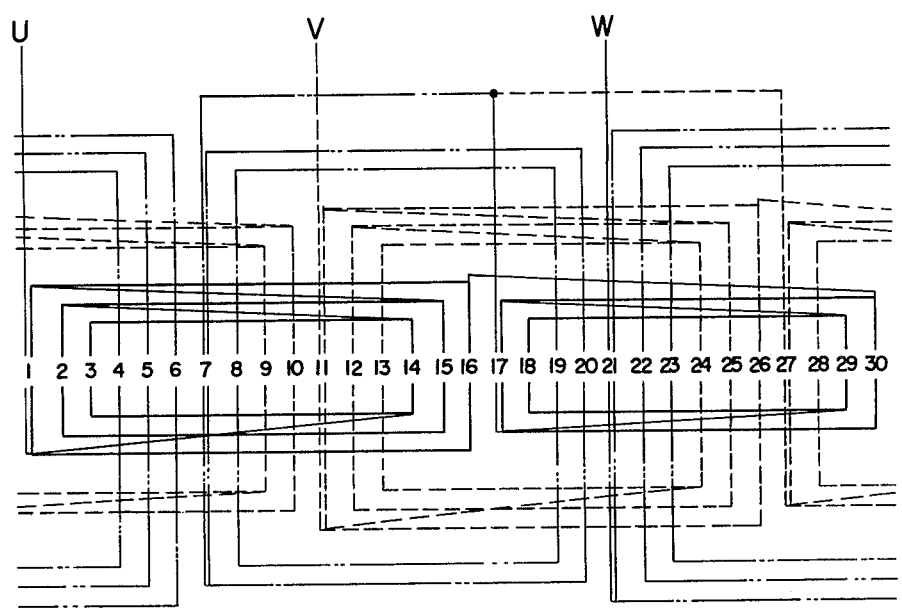
Figure 8:
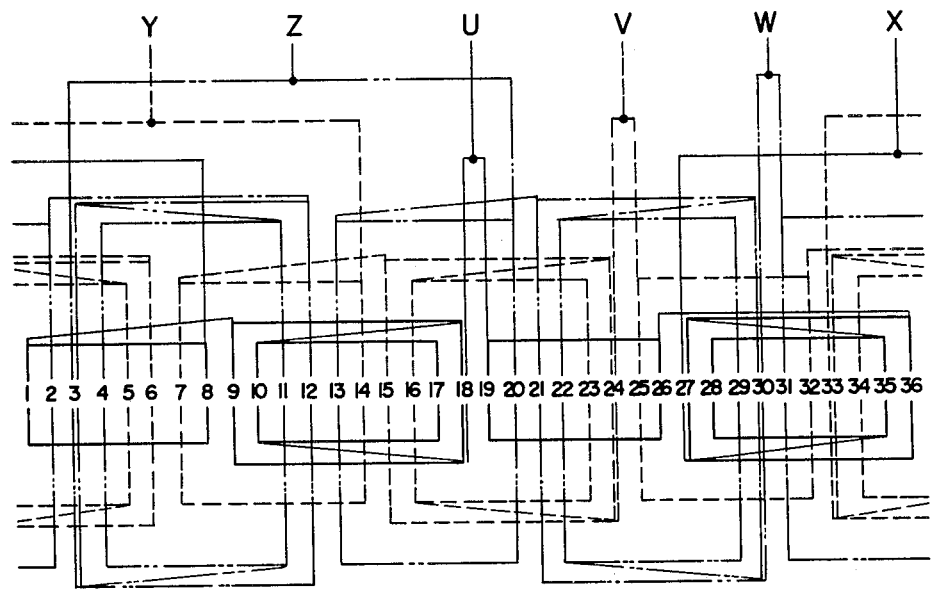
Figure 9:
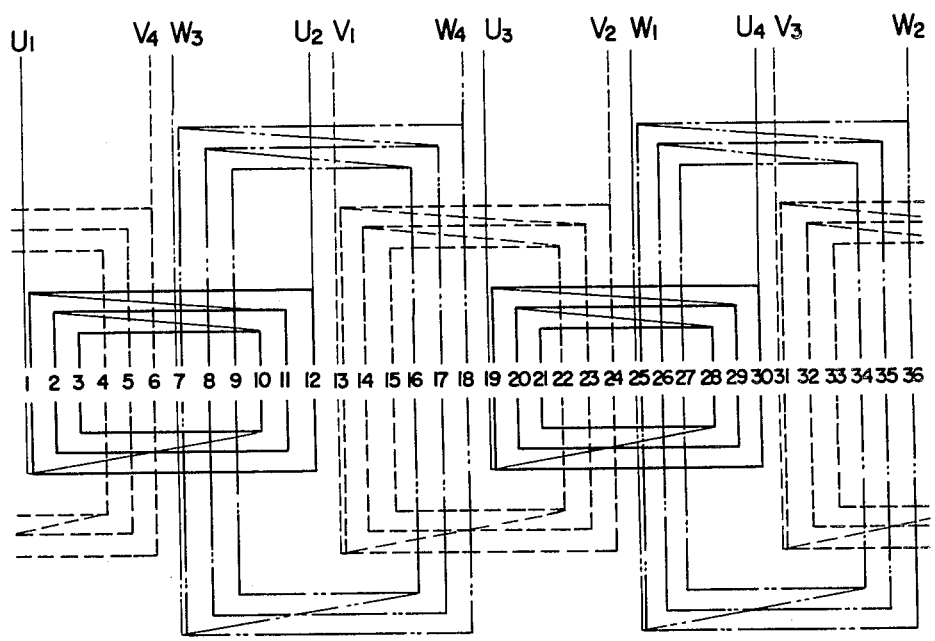
Figure 10:
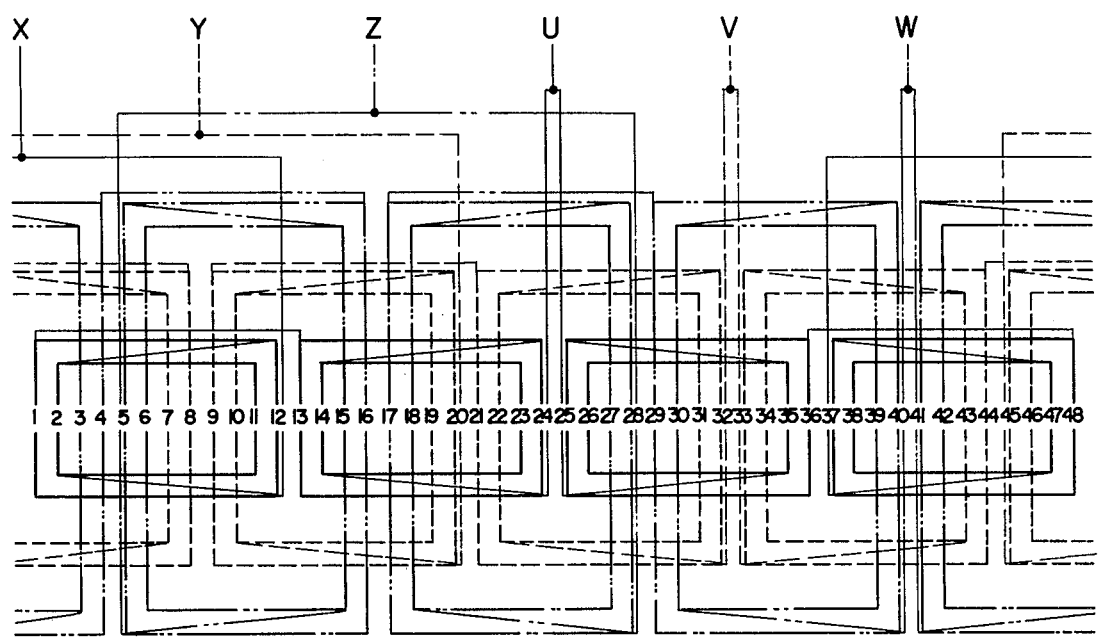

FIG. 5 shows another embodiment of the present invention in which the arrangement of the auxiliary coils is entirely the same as that in FIG. 4. The embodiment shown in FIG. 5 differs from that shown in FIG. 4 in that the main coils providing each pole are wound in the same direction.

FIGS. 6 to 10 show applications of the present invention to a three-phase armature winding. In an embodiment shown in FIG. 6, the present invention is applied to a three-phase armature winding in an armature of 2-pole 24-slot type. In another embodiment shown in FIG. 7, the present invention is applied to a three-phase armature winding of star connection in an armature of 2-pole 30-slot type. In still another embodiment shown in FIG. 8, the present invention is applied to a three-phase armature winding of parallel connection in an armature of 4-pole 36-slot type. In yet another embodiment shown in FIG. 9, the present invention is applied similarly to a three-phase armature winding in an armature of 4-pole 36-slot type. In a further embodiment shown in FIG. 10, the present invention is applied to a three-phase armature winding in an armature of 4-pole 48-slot type. In each of FIGS. 6 to 10, the U-phase coils, V-phase coils and W-phase coils are represented by the solid lines, broken lines and two-dot chain lines respectively. It will be apparent from these figures that the present invention is also equally effectively applicable to a three-phase armature winding. It will be also apparent that the number of phases is not in any way limited to those above described, and the present invention is generally applicable to a multi-phase armature winding.

Figure 11:
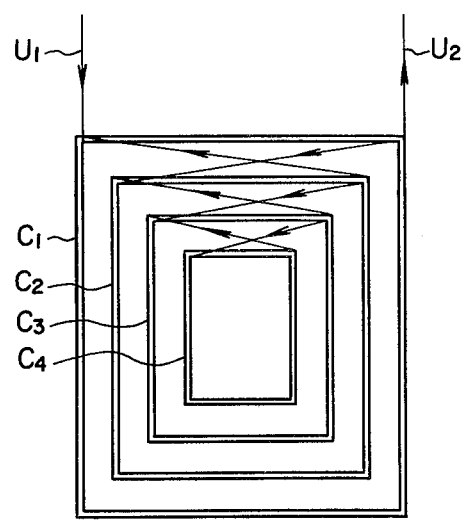
FIG. 11 is a developed view of part of another embodiment of the present invention.

FIG. 11 shows another embodiment of the present invention. In FIG. 11, the coils providing one of the poles are merely depicted. Referring to FIG. 11, the main coils $C_1$, $C_2$, $C_3$ and $C_4$ are partly continuously wound in the above order, and then, the remaining portions of the coils $C_4$, $C_3$, $C_2$ and $C_1$ are continuously wound in the above order to complete the coils providing one of the poles. The terminal conductors $U_1$ and $U_2$ are led out along the opposite coil sides respectively of the coil $C_1$ having the longest coil pitch among the plural coils.

I claim:

1. A winding structure of an armature in a rotary machine, said structure comprising a plurality of coil assemblies each having a pair of lead-out conductors and each being composed of a plurality of coils wound in a core of said armature, said coils of each coil assembly being wound concentrically with different pitches from one another and wound continuously in series according to the order of the magnitude of the pitch, said pair of lead-out conductors being connected respectively to the ends of said continuously serially-wound coil assembly and being disposed only at the opposite sides of the coil having the largest pitch.

2. A winding structure according to claim 1, wherein in each of said coil assemblies, one of said lead-out conductors is connected to a coil end of the coil having the largest pitch and the other lead-out conductor is connected to a coil end of the coil having the smallest pitch.

3. A winding structure according to claim 1, wherein at least one of said pair of lead-out conductors extends in a first direction from said coil assembly.

4. A winding structure according to claim 3, wherein both of said pair of lead-out conductors extend in the first direction from said coil assembly.

* * * * *